Patented Dec. 11, 1951

2,578,433

UNITED STATES PATENT OFFICE 2,578,433

PROCESS FOR PRODUCING APPARENT SOLIDIFICATION OF LIQUID HYDROCARBONS

Jean Pathus Labour, Washington, D. C., assignor to Gasoline Research Industrial & Commercial Company, Inc., Panama, Panama, a company of Panama No Drawing. Application February 28, 1948, Serial No. 12,154. In France June 27, 1939

13 Claims. (Cl. 44—7)

The present patent application has for its object the solidification of petrol gasoline in the form of a coagulatable gel adapted either to be reliquified under pressure, or evaporated and thereafter condensed by means of automatic apparatus such as special carburetors.

It is stated in applicant's U. S. application Serial No. 12,153, filed February 28, 1948, corresponding to the French Patent No. 860,470, applied for in France on June 27, 1939, issued September 30, 1940, and published January 16, 1941, relating to solidified gasoline, that it was possible to mix with alkali soluble methyl cellulose various inert substances or substances capable of reacting according to certain desired chemical equations.

An alkali soluble cellulose methyl ether containing only one-fourth (¼) methyl ether group per glucose residue prepared by reacting alkali cellulose with methyl chloride may be used. "Tylose-type 4S," manufactured and sold by Kalle & Co., Wiesbaden-Biebrich, Germany, for use as a permanent finish for textiles is such a special tylose.

Gelose and pulverised plants were mentioned, acting either as fillers or both as fillers and as active substances.

The process disclosed in the above identified French patent and the corresponding U. S. application consists first in forming a colloidal solution of an alkali soluble methyl cellulose, sodium hydroxide and gasoline, and subsequently passing this colloidal solution through a dividing machine in which it is broken up into fragments which may be substantially the size of a hazelnut. As fast as this breaking up progresses, the gasoline gel falls into a coagulating liquid generally comprising an acid alone, or associated with certain salts.

Thus, one may use sulfuric acid alone, or sulfuric acid associated with sodium sulfate or copper sulfate, or even both said salts together.

Finally the sulfuric acid may be omitted and an acidic salt may be used such as, for instance, the bi-sulfate, or else a neutral salt which should then however be formed from a metal of a heavier series such as copper, lead, iron, manganese, or the like.

It was also stated that in the French patent and the U. S. application referred to that the use of the soluble tylose in the soda may also be effected in the presence of other substances which act either as fillers to provide body to the gel, or act as active substances, or even both as fillers and as active substances. It was also stated that, by way of example, such substances could be gelose or pulverized plant wastes and that the plants used should contain vegetable juices capable of forming a binder in the presence of soda, the effect of which is cumulative with that of the methyl cellulose.

By way of non-restrictive examples, the following formulae were set out:

I

A.—Emulsion.—Preparation with tylose alone

| | | |
|---|---|---|
| Special soda-soluble tylose | gr | 1 |
| Caustic soda of suitable density | gr | 1 |
| Water | gr | 5 to 10 |
| Petroleum gasoline | cc | 100 |

B.—Coagulating bath

| | | |
|---|---|---|
| Sulfuric acid | gr | 20 |
| Distilled water | cc | 1000 |
| Sodium sulfate | gr | 50 |

B-2.—Further coagulating bath

| | | |
|---|---|---|
| Sulfuric acid | gr | 10 |
| Distilled water | litre | 1 |
| Sodium sulfate | gr | 20 |
| Copper sulfate | gr | 50 |

II

A.—Preparation with compounded tylose

| | | |
|---|---|---|
| Special soda-soluble tylose | centigr | 50 |
| Gelose | gr | 1 |
| Caustic soda of suitable density | gr | 1 |
| Water | gr | 15 |
| Petrol gasoline | cc | 100 |

B.—Further example of a compounded tylose

| | | |
|---|---|---|
| Special soda soluble tylose | gr | 0.5 to 1 |
| Pulverized plant waste products | gr | 2 |
| Caustic soda of suitable density | gr | 1 |
| Water | gr | 15 |
| Gasoline | cc | 100 |

In the present method, among the plants capable of being used, plants rich in legumina are selected, such as leguminous plants and in particular soya beans and plants pertaining to the group of Phaeophyceae.

It is also possible to make direct use of the active constituents of such plants. In the present method such plants or the substances derived therefrom are used either in admixture with the alkali soluble methyl cellulose, as specified in the above mentioned patent application, or alone, it also being understood that it is always possible to resort to the active constituents of such plants without employing the cellulosic filler which they introduce.

The main thing is to treat such plants or substances with an excess of sodium hydroxide or, preferably magnesium oxide, in the form of a milk, or in other words with an amount of alkali greater than the amount necessary to render the active constituents mentioned above soluble, the excess alkali being designed to subsequently react, after production of the gasoline gel, with the copper salt; the latter in turn is used in a sufficient amount to react with the alkali combined with the active vegetable constituents and to simultaneously form a hydroxide.

Such reaction is essential in order to obtain a solidified gasoline free from evaporation and any seeping.

That is, when this reaction does not take place, in spite of the micellae of the gel, the latter leave between each other empty spaces, which may be detected by microscopic examination and which may allow the gasoline to seep out by surface tension action and to evaporate.

The formation of the copper hydroxide with the excess of the copper salt and the excess of alkali insures the sealing of such microscopic interstices into which the hydroxide is precipitated and is then converted into an oxide.

Thus, with this method it could be possible to use substances which otherwise have not given satisfactory results, such as the casein of milk for instance, which has formed the subject of several patents.

The various tests which have been carried out following the methods disclosed herein, utilizing any substance liable to coagulate after the formation of a soluble composition, have led to perfect results, in regard to the absence of evaporation and seeping in the final product, which results it would be impossible to obtain or even to approach with a calcium salt.

It is obvious that salts of other metals forming gelatinous hydroxides convertible with time into anhydrous oxides such as the salts of iron, for example, could be used.

What is claimed is:

1. The process of producing apparent solidification of liquid hydrocarbons which comprises treating at least one suitable plant substance selected from the group consisting of leguminous plants and plants in the Phaeophyceae group with an excess of at least one alkali selected from the group made up of sodium hydroxide and magnesium oxide in the form of milk, forming an emulsion of said plant substances, said alkali, said hydrocarbons and methyl cellulose insoluble in water but alkali-soluble and causing said emulsion to assume a solid form by bringing said emulsion into association with at least one reagent selected from the group made up of sulfuric acid and the neutral salts of copper, lead, iron and manganese.

2. The process of producing apparent solidification of liquid hydrocarbons which comprises treating at least one suitable plant substance selected from the group consisting of leguminous plants and plants in the Phaeophyceae group with an excess of at least one alkali selected from the group made up of sodium hydroxide and magnesium oxide in the form of milk, forming an emulsion of said plant substances, said alkali, said hydrocarbons and methyl cellulose insoluble in water, but alkali-soluble and causing said emulsion to assume a solid form by bringing said emulsion into association with sulfuric acid and copper sulfate.

3. The process of producing apparent solidification of liquid hydrocarbons which comprises treating at least one suitable plant substance selected from the group consisting of leguminous plants and plants in the Phaeophyceae group with an excess of at least one alkali selected from the group made up of sodium hydroxide and magnesium oxide in the form of milk, forming an emulsion of said plant substance, said alkali, said hydrocarbons and methyl cellulose insoluble in water, but alkali-soluble and causing said emulsion to assume a solid form by bringing said emulsion into association with the sulfate of copper.

4. The process of producing apparent solidification of liquid hydrocarbons which comprises treating at least one suitable plant substance selected from the group consisting of leguminous plants and plants in the Phaeophyceae group with an excess of at least one alkali selected from the group made up of sodium hydroxide and magnesium oxide in the form of milk, forming an emulsion of said plant substance, said alkali, said hydrocarbons and methyl cellulose insoluble in water, but alkali-soluble and causing said emulsion to assume a solid form by bringing said emulsion into association with the salt of a metal adapted to form a gelatinous hydroxide convertible with time into an anhydrous oxide.

5. The process of producing apparent solidification of liquid hydrocarbons which comprises treating at least one suitable plant substance selected from the group consisting of leguminous plants and plants in the Phaeophyceae group with an excess of at least one alkali selected from the group made up of sodium hydroxide and magnesium oxide in the form of milk, forming an emulsion of said plant substances, said alkali and said hydrocarbons, and causing said emulsion to assume a solid form by bringing said emulsion into association with sulfuric acid and copper sulfate.

6. The process of producing apparent solidification of liquid hydrocarbons which comprises treating at least one suitable plant substance selected from the group consisting of leguminous plants and plants in the Phaeophyceae group with an excess of at least one alkali selected from the group made up of sodium hydroxide and magnesium oxide in the form of milk, forming an emulsion of said plant substances, said alkali and said hydrocarbons, and causing said emulsion to assume a solid form by bringing said emulsion into association with the sulfate of copper.

7. The process of producing apparent solidification of liquid hydrocarbons which comprises treating at least one suitable plant substance selected from the group consisting of leguminous plants and plants in the Phaeophyceae group with an excess of at least one alkali selected from the group made up of sodium hydroxide and magnesium oxide in the form of milk, forming an emulsion of said plant substances, said alkali and said hydrocarbons, and causing said emulsion to assume a solid form by bringing said emulsion into association with the salt of a metal adapted to form a gelatinous hydroxide convertible with time into an anhydrous oxide.

8. The process of producing apparent solidification of liquid hydrocarbons which comprises treating at least one suitable plant substance selected from the group consisting of leguminous plants and plants in the Phaeophyceae group with an excess of at least one alkali selected from the group made up of sodium hydroxide and magnesium oxide in the form of milk, forming an emulsion of said plant substances, said alkali, said hydrocarbons and an alkali soluble cellulose methyl ether containing only one-fourth (¼) methyl ether group per glucose residue, and causing said emulsion to assume a solid form by bringing said emulsion into association with sulfuric acid and copper sulfate.

9. The process of producing apparent solidification of liquid hydrocarbons which comprises treating at least one suitable plant substance selected from the group consisting of leguminous plants and plants in the Phaeophyceae group with an excess of at least one alkali selected from the group made up of sodium hydroxide and magnesium oxide in the form of milk, forming an emulsion of said plant substance, said alkali, said hydrocarbons and an alkali soluble cellulose methyl ether containing only one-fourth (¼) methyl ether group per glucose residue, and causing said emulsion to assume a solid form by bringing said emulsion into association with the sulfate of copper.

10. The process of producing apparent solidification of liquid hydrocarbons which comprises treating at least one suitable plant substance selected from the group consisting of leguminous plants and plants in the Phaeophyceae group with an excess of at least one alkali selected from the group made up of sodium hydroxide and magnesium oxide in the form of milk, forming an emulsion of said plant substance, said alkali, said hydrocarbons and an alkali soluble cellulose methyl ether containing only one-fourth (¼) methyl ether group per glucose residue, and causing said emulsion to assume a solid form by bringing said emulsion into association with the salt of a metal adapted to form a gelatinous hydroxide convertible with time into an anhydrous oxide.

11. The process of producing apparent solidification of liquid hydrocarbons which comprises treating at least one suitable plant substance selected from the group consisting of leguminous plants and plants in the Phaeophyceae group with an excess of at least one alkali selected from the group made up of sodium hydroxide and magnesium oxide in the form of milk, forming an emulsion of said plant substances, said alkali, said hydrocarbons and an alkali soluble cellulose methyl ether containing only one-fourth (¼) methyl ether group per glucose residue prepared by reacting alkali cellulose with methyl chloride, and causing said emulsion to assume a solid form by bringing said emulsion into association with sulfuric acid and copper sulfate.

12. The process of producing apparent solidification of liquid hydrocarbons which comprises treating at least one suitable plant substance selected from the group consisting of leguminous plants and plants in the Phaeophyceae group with an excess of at least one alkali selected from the group made up of sodium hydroxide and magnesium oxide in the form of milk, forming an emulsion of said plant substance, said alkali, said hydrocarbons and an alkali soluble cellulose methyl ether containing only one-fourth (¼) methyl ether group per glucose residue prepared by reacting alkali cellulose with methyl chloride, and causing said emulsion to assume a solid form by bringing said emulsion into association with the sulfate of copper.

13. The process of producing apparent solidification of liquid hydrocarbons which comprises treating at least one suitable plant substance selected from the group consisting of leguminous plants and plants in the Phaeophyceae group with an excess of at least one alkali selected from the group made up of sodium hydroxide and magnesium oxide in the form of milk, forming an emulsion of said plant substance, said alkali, said hydrocarbons and an alkali soluble cellulose methyl ether containing only one-fourth (¼) methyl ether group per glucose residue prepared by reacting alkali cellulose with methyl chloride, and causing said emulsion to assume a solid form by bringing said emulsion into association with the salt of a metal adapted to form a gelatinous hydroxide convertible with time into an anhydrous oxide.

JEAN PATHUS LABOUR.

REFERENCES CITED

The following references are of record in the file of this patent:

FOREIGN PATENTS

| Number | Country | Date |
| --- | --- | --- |
| 860,471 | France | Sept. 30, 1940 |